(12) United States Patent
Chakravarthy et al.

(10) Patent No.: US 9,544,214 B2
(45) Date of Patent: Jan. 10, 2017

(54) SYSTEM AND METHOD FOR OPTIMIZED EVENT MONITORING IN A MANAGEMENT ENVIRONMENT

(75) Inventors: Sridhar Chakravarthy, Bangalore (IN); Vaideeswaran Ganesan, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 705 days.

(21) Appl. No.: 13/196,629

(22) Filed: Aug. 2, 2011

(65) Prior Publication Data

US 2013/0036216 A1 Feb. 7, 2013

(51) Int. Cl.
*H04L 12/26* (2006.01)
*G06F 11/07* (2006.01)
*G06F 11/30* (2006.01)
*H04L 12/24* (2006.01)

(52) U.S. Cl.
CPC .......... *H04L 43/10* (2013.01); *G06F 11/0709* (2013.01); *G06F 11/0751* (2013.01); *G06F 11/3006* (2013.01); *G06F 11/3072* (2013.01); *G06F 11/3093* (2013.01); *H04L 41/069* (2013.01); *H04L 41/0213* (2013.01); *H04L 41/046* (2013.01)

(58) Field of Classification Search
CPC ........................... H04L 41/069; H04L 12/2602
USPC ........................................................ 709/224
See application file for complete search history.

(56) References Cited

U.S. PATENT DOCUMENTS

| | | | |
|---|---|---|---|
| 6,363,421 B2 * | 3/2002 | Barker et al. ................. | 709/223 |
| 6,985,901 B1 * | 1/2006 | Sachse et al. | |
| 8,260,956 B2 * | 9/2012 | Reyhner et al. .............. | 709/238 |
| 2008/0104276 A1 * | 5/2008 | Lahoti et al. ................. | 709/245 |
| 2009/0228579 A1 * | 9/2009 | Sanghvi et al. .............. | 709/224 |

* cited by examiner

*Primary Examiner* — Luat Phung
*Assistant Examiner* — Saad A Waqas
(74) *Attorney, Agent, or Firm* — Baker Botts L.L.P.

(57) ABSTRACT

In accordance with the present disclosure, a system and method for optimizing event monitoring in a management environment is disclosed. The system may include a management system, an agent system, an intermediate management module and an event generation engine. The intermediate management module may create a device object in the management system corresponding to the agent system. The event generation engine may convert a transmission from the agent system into a pre-determined event structure and inject the event structure into the device object. The intermediate management module may then generate an alert in response to the injection of the event structure.

10 Claims, 3 Drawing Sheets

SYSTEM AND METHOD FOR OPTIMIZED EVENT MONITORING IN A MANAGEMENT ENVIRONMENT

TECHNICAL FIELD

The present disclosure relates generally to the operation of computer systems and information handling systems, and, more particularly, to a system and method for optimized event monitoring in a management environment.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include numerous components, each connected through a network. Some components may monitor other network components for critical events and alert network managements about the problems. One example system that monitors network components is a System Center Operations Management (SCOM) server, which may connect to and monitor other system servers. Each system server may forward local events to the SCOM server, which applies filtering rules to events and maintains an event log. The filtering rules may be part of a management pack. With each event that is monitored in the management pack, the SCOM creates a thread associated with the system server and the event. These threads may statically occupy bytes within system storage whether or not each of the alerts are generated, decreasing the efficiency of system storage. When many system servers are connected to the SCOM, the problem compounds, particularly when many of the threads may be essentially duplicates of threads for similar system servers.

SUMMARY

In accordance with the present disclosure, a system and method for optimizing event monitoring in a management environment is disclosed. The system may include a management system, an agent system, an intermediate management module and an event generation engine. The intermediate management module may create a device object in the management system corresponding to the agent system. The event generation engine may convert a transmission from the agent system into a pre-determined event structure and inject the event structure into the corresponding device object. The intermediate management module may then generate an alert in response to the injection of the event structure.

The system and method disclosed herein is technically advantageous because it decreases the processing and storage capacity required to manage a network component. For example, instead of each network components requiring a dedicated thread for each possible event, each alert can be injected into the data base and reported as an event when it occurs. This frees up computational capacity and storage within the management and agent systems. Additionally, because the alerts from the agent nodes are received at a separate event generation engine instead of directly at the management system, the management environment can be scaled to include a much larger number of network components, as the processing capacity of the management system can be decreased, and the event generation engine can include policies to restrict the flow of errors to the management system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
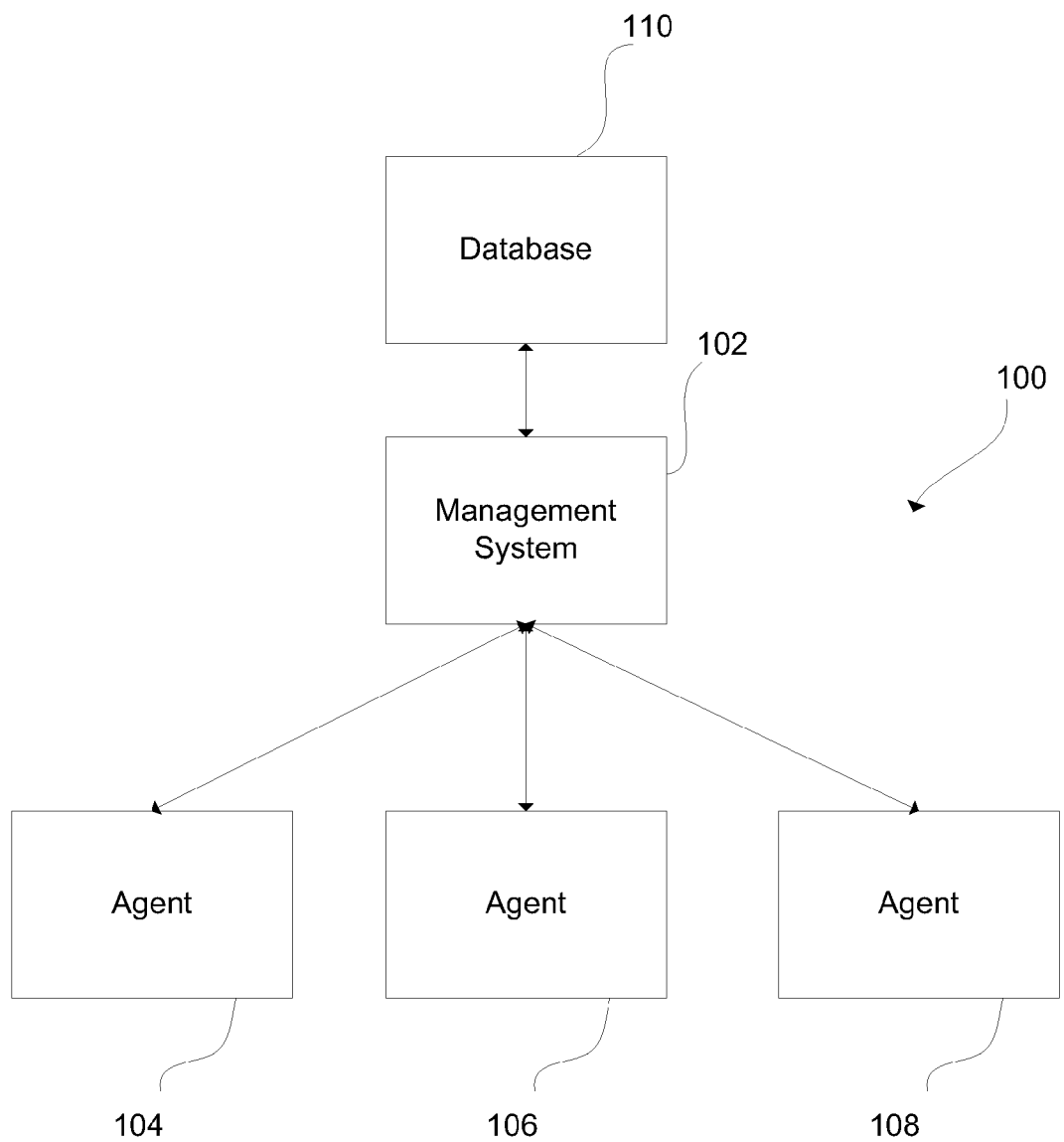
FIG. 1 illustrates an example existing management environment.

The present invention is directed to optimizing event monitoring in a management environment. FIG. 1 illustrates an example monitoring environment 100. The monitoring environment includes a management system 102 and agent systems 104, 106, and 108. The agent systems may include devices, such as server systems, each having components that need to monitored. Example components and elements include hard drives, busses, software programs, temperature sensors, storage volumes, blades, etc. The agent systems 104, 106, and 108 may be coupled to the management system 102 via wide or local area networks. The management system 102 may include a management application, such as System Center Operations Management (SCOM), which receive event notifications from the agent systems. The management system 102 may store the notifications in a database 110 coupled to the management system 102. The management system 102 may also generate alerts according to the filters and rules defined in a management pack, which may also be stored locally in the management system 102 or database 110. The management application may create a thread corresponding to each event tracked by the intermediate management module, regardless of whether the event actually occurs. This decreases the usable memory and processing space within the management system and decreases the overall efficiency of the system.

Figure 2:
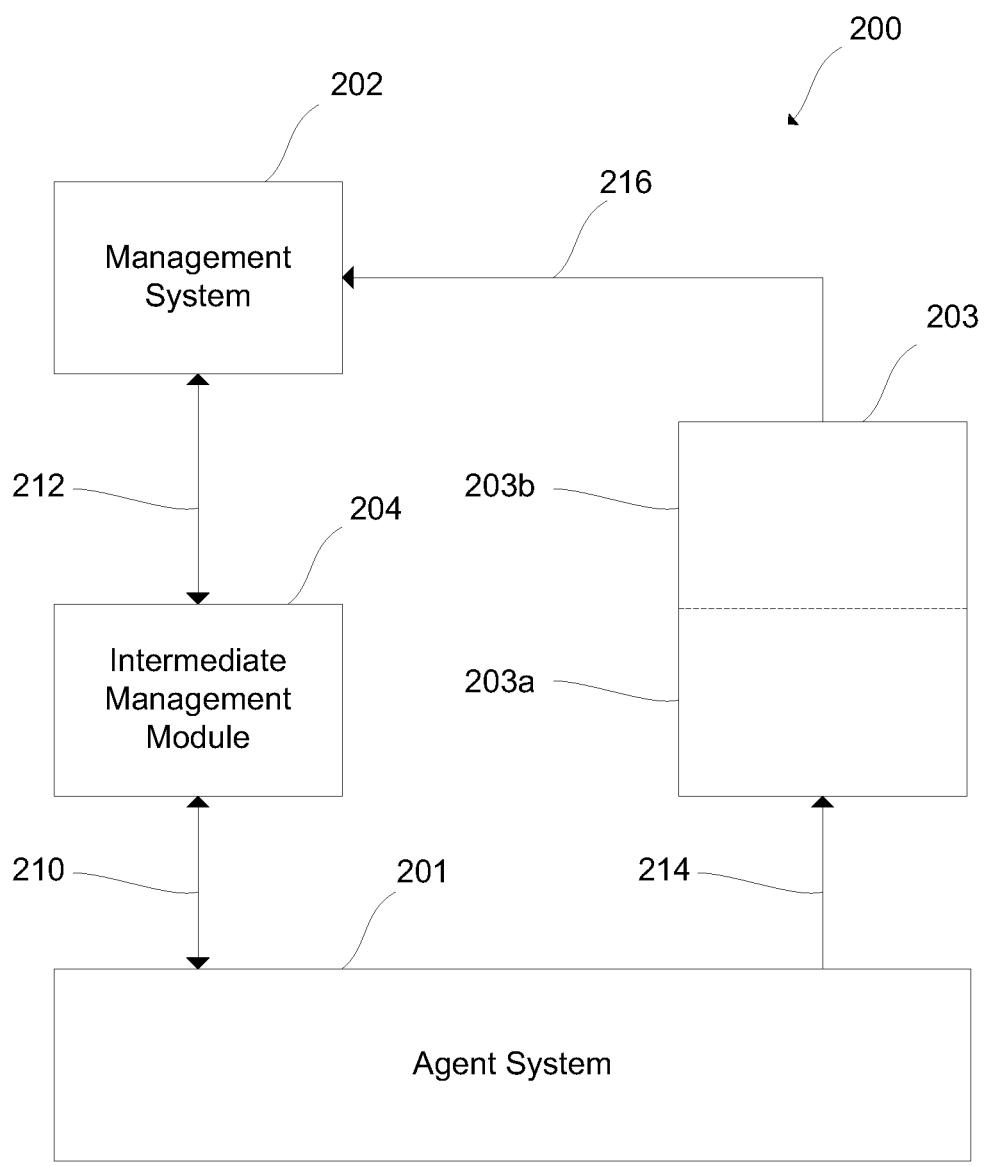
FIG. 2 illustrates an example optimized system for event notification in a management environment, incorporating aspects of the present invention.

FIG. 2 illustrates an optimized event monitoring system, incorporating elements and processes according to aspects of the present invention. The optimized event monitoring system includes an agent system 201, a management system 202, an event generation engine 203 and an intermediate management module 204. Each of the agent system 201, a management system 202, an event generation engine 203 and intermediate management module 204 may be implemented in a separate information handling system, such as a server system. In other embodiments, some of the elements may be combined into a single server system. Intermediate management module 204 and event generation engine 203 may be additional systems added between agent systems and a management system in FIG. 1, according to aspects of the present invention.

The intermediate management module 204 may operate independently from both the management system 202 and the agent system 201. The independence increases the flexibility of the management environment and decreases the complexity required to implement the intermediate management module, management system, and agent system, as will be discussed below. In certain embodiments, the intermediate management module 204 may communicate with both the agent system 201 and the management system 202 over communication channels 210 and 212, respectively. Communication channels 210 and 212 may be, for example, a wide or local area network. In certain embodiments, the intermediate management module 204 may communicate with a plurality of agent systems, each communicating with the intermediate management module 204 through separate communication channels. The intermediate management module 204 may poll each of the connected system to detect the presence of agent systems. The polling may be completed as part of a discovery software routine in the intermediate management module 204. Once an agent system is detected, the intermediate management module 204 may create a device object corresponding to the agent system in the event database. The device object may comprise a unique identifier for the agent system, such as a Service Tag corresponding to the agent system. The device object may be stored in a storage medium located in the management system by the intermediate management module sending the device objects and a command to the management system 202 over communication channel 212. Communication channel 212, in some embodiments, may be comprised of communication busses or connections interfaces located internally on a server system. In certain embodiments, the management system 202 may include a separate database like database 110 in FIG. 1.

The agent system may include software, hardware, or firmware designed to transmit alerts in response to conditions on the agent system. For example, the agent system may include a Dell LifeCycle Controller that is included as part of a Dell Integrated Dell Remote Access Controller (iDRAC). The alerts may take the form of Simple Network Management Protocol (SNMP) traps. The agent system may have a predefined number of condition triggers which result in the transmission of alerts in the form of SNMP traps. In existing management environments, the SNMP traps are sent directly to the management system. In the optimized event monitoring system shown in FIG. 2, the SNMP traps may first be transmitted to the event generation engine 203. The event generation engine 203 is advantageous because it allows for the processing of SNMP traps to be offloaded. Offloading the processing of SNMP traps removes the need to use SCOM infrastructure on the management system 102 to process events. As SCOM infrastructure creates static threads for each possible alert that may be received from an agent system, offloading the processing of SNMP traps results in significant storage and processor savings.

The SNMP traps may be transmitted over communication channel 214 to event generation engine 203. The event generation engine 203 receives the alerts and converts the alerts to a pre-determined format for the management system 202, such a SCOM event structure. In the case of an SNMP trap, the event generation engine 203 may include computer-readable instructions in the form of a software routine that parses the SNMP protocol data unit (PDU), and fills the event structure with the Service Tag and other data related to the SNMP trap. The event generation engine 203 may then inject the event to the corresponding server object in the management system 202 over communication channel 216. Injecting the event into the management system 202 may cause the event to be stored in a storage medium of the management system 202, where it is associated with the corresponding device object in the storage medium.

In certain embodiments, the event generation engine 203 may be comprised of an offload engine 203a and an event generator 203b. The offload engine 203a may receive the SNMP trap from agent system 201 and call the event generator 203b. The event generator 203b may then parse the SNMP PDU, as described above. The event generator 203b may then use an InsertCustomMonitoringEvent command from the SCOM software development kit (SDK) to inject the event into a storage medium of the management system 202.

Once the event is injected to the corresponding server object, the intermediate management module 204 may convert the event to an SCOM Alert. Converting the event to an SCOM Alert may include processing the event and comparing the event with a list of actions to be taken in response to the alert. For example, a SCOM Alert may require that an administrator be notified by email about an event. The intermediate management module 204 may generate the SCOM alert by receiving the event notification or data related to the event notification over communication channel 212. The intermediate management module 204 may then apply filters or rules to the event, generate the necessary SCOM Alert, and transmit the SCOM Alert back to the management system 202 over the communication channel 212.

In certain embodiments, the event generation engine 203 may maintain a storage medium to cache a pre-determined number of events in a first in first out structure. The event generation engine 203 may cache the alerts after they have been converted into an SCOM event structure. The cache may also store the time at which each of the event were generated. Caching the events allows the event generation engine to limit the flow of events to the management system 202 and intermediate management module 204. For example, internal logic in the event generation engine may place constraints on the generation of events such than not more than 10 events can be generated per minute. The event generation engine 203 can then determine the number of events generated and the time at which they were generated using the cache, and only inject events into the device objects when the constraints were met. This cache is advantageous, because it reduces the storage and processing capacity needed to process the events in both the management system 202 and the intermediate management module 204.

Figure 3:
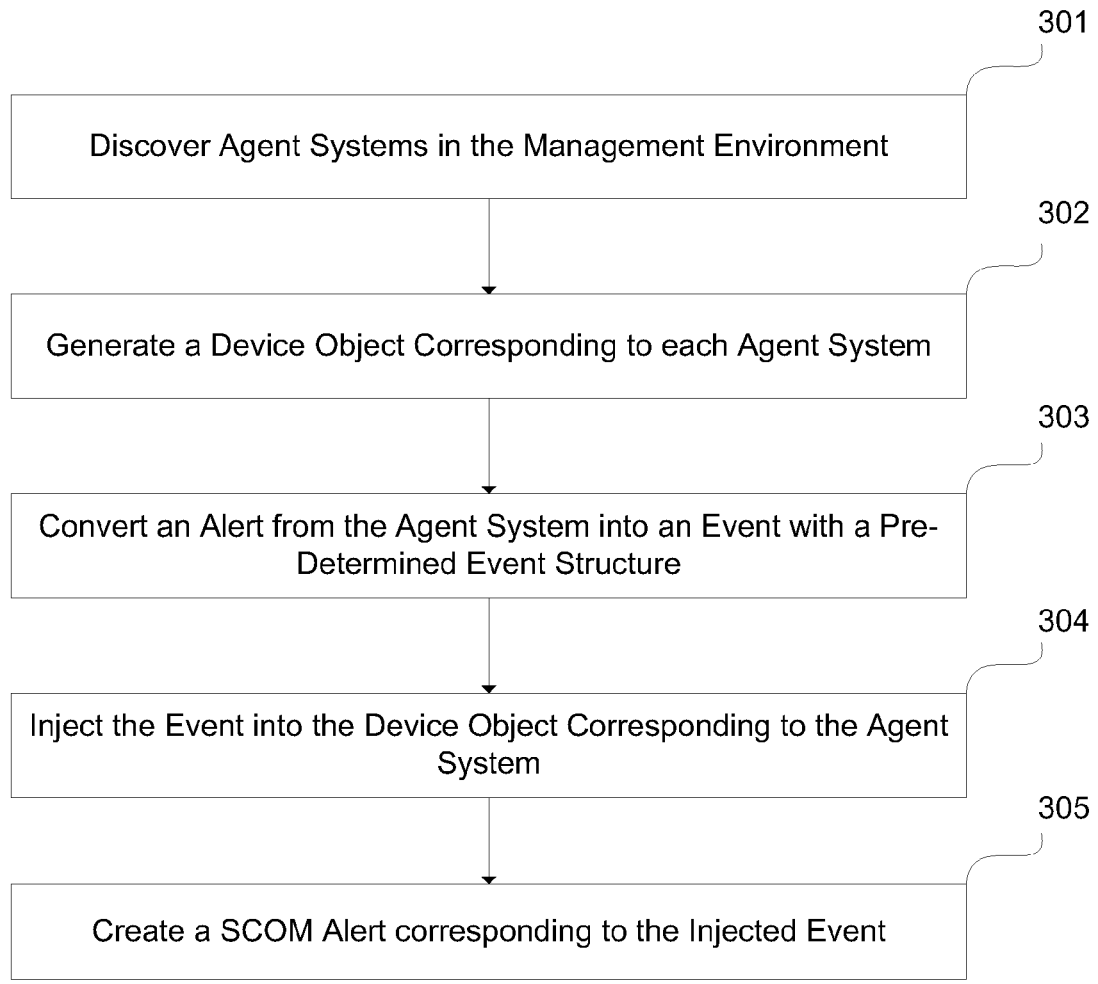
FIG. 3 illustrates an example method for optimizing event notification according to aspects of the present invention.

FIG. 3 illustrates a flow chart of a method for optimizing event notification according to aspects of the present invention. The method may begin at step 301, where all agent systems in a management environment are discovered. An intermediate management module, such as intermediate management module 204 from FIG. 2 may discover the agent systems using a discovery software routine. The discovery software routine may poll all systems connected to the intermediate management module via communication channels, such as local or wide area network connections, to identify the agent systems. The discovery routine may also retrieve unique identifiers for each of the agent systems, which may comprise a unique Service Tag for each of the agent systems.

At step 302, a device object corresponding to each agent system may be generated. The device object may be generated using an intermediate management module, such as the intermediate management module 204 from FIG. 2. The device object may include a unique identifier for the corresponding agent system, such as a Service Tag. The device object may be created by the intermediate management module in a management system, such as the management system 202 in FIG. 2. The device object may be stored in a storage medium of or coupled to the management system.

At step 303 an alert from an agent system may be converted into a event with a pre-determined structure. Step 303 may include receiving an alert, such as an SNMP trap, from the agent system at an event generation engine, such as the event generation engine 203 from FIG. 2. The event generation engine may then parse the alert for information which identifies the agent system, such as a Service Tag, and information which identifies the cause of the alert. The event generation engine may then populate a pre-determined data structure (event) with the information from the alert. The pre-determined data structure may be, for example, an SCOM event structure.

At step 304, the event structure populated with the alert data may be injected into the server object corresponding to the agent system which transmitted the alert. Injecting the event structure may be accomplished by using an InsertCustomMonitoringEvent command from the SCOM SDK. The step of injecting the event structure may be accomplished by an event generation engine, such as the event generation engine 203 from FIG. 2. Step 304 may also include transmitting the event structure to a management system, such as the management system 202 from FIG. 2, over a communication bus.

At step 305, a SCOM alert may be generated from the event structure injected into the device object. Unlike existing management environments, where threads on the management system detect and process events from agent systems, step 305 may be accomplished by an intermediate management module, such as intermediate management module 204 in FIG. 2, which operates independently of the management system. The intermediate management module may receive the event structure or some data related to the event structure from a management system over a communication channel. The intermediate management module may apply filters and rules to the event, determining whether to create a SCOM alert in response to the system. If the intermediate management module determines that an SCOM alert is necessary, the intermediate management module may transmit the SCOM alert to the management system. Processing the SCOM alerts in the intermediate management module is advantageous, because it removes the processing responsibility from the management system, where SCOM infrastructure rigidly applies inefficient processing functions. For example, by placing processing responsibility in the intermediate management module, the number of threads required can be greatly decreased, as the SCOM infrastructure would not require a separate thread be created for every device and component monitored in an agent system.

Although the present disclosure has been described in detail, it should be understood that various changes, substitutions, and alterations can be made hereto without departing from the spirit and the scope of the invention as defined by the appended claims.

What is claimed is:

1. A method for optimizing event monitoring in a management environment, comprising:
   discovering an agent system using an intermediate management module, wherein the agent system comprises a device that is monitored, wherein the intermediate management module polls each system connected to the intermediate management module to discover the agent system, and wherein the agent system comprises one or more pre-defined condition triggers, and wherein each agent system communicates to the intermediate management module through a separate communications channel, wherein the communications channel comprises a network;
   generating by the intermediate management module in a management system a device object corresponding to the agent system, wherein the intermediate management module operates independently from the management system and the agent system;
   sending by the intermediate management module the device object and a command to the management system via the separate communications channel;
   storing the device object in a storage medium located in the management system;
   converting an agent system transmission into an event with a pre-determined structure using an event generation engine, wherein the agent system transmission comprises an SNMP trap, wherein the pre-determined structure comprises an SCOM event structure, and wherein the converting comprises:
      receiving an agent system alert from the agent system at the event generation engine;
      parsing the agent system alert by the event generation engine, wherein the parsing comprises identifying the agent system and a cause of the agent system alert; and populating the pre-determined data structure based, at least in part, on information parsed from the alert;

injecting the event into the device object over the separate communications channel, wherein injecting the event comprises using an InsertCustomMonitoringEvent command from an SCOM software development kit (SDK) over the separate communications channel;

creating, using the intermediate management module, an alert in response to the event in the device object, wherein the alert comprises an SCOM alert, wherein at least one of the pre-defined condition triggers in the agent system corresponds to the SCOM alert; and transmitting the alert to the management system.

2. The method of claim 1, wherein the device object comprises a unique identifier of the agent system.

3. The method of claim 1, wherein the event generation engine is comprised of an offload engine and an event generator.

4. The method of claim 1, wherein the event generation engine includes a cache which stores at least one previously generated event and the time at which the at least one previously generated event was generated.

5. A system for optimized event monitoring in a management environment, comprising: a management system; an agent system, wherein the agent system comprises a device that is monitored;

an intermediate management module, wherein the intermediate management module creates a device object in the management system corresponding to the agent system, wherein the intermediate management module polls each systems connected to the intermediate management module to discover the agent system, wherein the intermediate management module operates independently from the management system and the agent system;

a communications channel, wherein each agent system communicates to the intermediate management module via a separate communications channel, wherein the communications channel comprises a network, wherein the intermediate management module sends the device object and a command to the management system via the separate communications channel;

one or more pre-defined condition triggers of the agent system;

a command, wherein the intermediate management module sends the command and the device object to the management system;

a storage medium located in the management system, wherein the device object is stored in the storage medium;

an event generation engine, wherein the event generation engine converts an agent system transmission into an event with a pre-determined event structure, wherein the agent system transmission comprises an SNMP trap, wherein the pre-determined event structure comprises an SCOM event structure, wherein the event generation engine injects the event into the device object using the InsertCustomMonitoringEvent command from an SCOM software development kit (SDK) over the separate communications channel, wherein the agent system transmission comprises an agent system alert from the agent system, wherein the agent system alert comprises information including, but not limited to, the agent system and a cause of the agent system alert, and wherein the pre-determined event structure comprises the information; and wherein the intermediate management module generates an SCOM alert in response to the injection of the event in the device object, wherein at least one of the pre-defined condition triggers in the agent system corresponds to the SCOM alert, and wherein the alert is transmitted to the management system.

6. The system of claim 5, wherein the device object comprises a unique identifier of the agent system.

7. The system of claim 5, wherein the event generation engine is comprised of an offload engine and an event generator.

8. The system of claim 5, wherein the event generation engine include a cache which stores at least one previously generated event and the time at which the at least one previously generated event was generated.

9. A method for optimizing event monitoring in a management environment, comprising:

discovering an agent system using an intermediate management module, wherein the agent system comprises a device that is monitored, wherein the intermediate management module polls each system connected to the intermediate management module to discover the agent system;

generating by the intermediate management module in a management system a device object corresponding to the agent system, wherein the intermediate management module operates independently from the management system and the agent system, and wherein the agent system comprises one or more pre-defined condition triggers;

sending by the intermediate management module the device object and a command to the management system via a separate communications channel, wherein the communications channel comprises a network;

storing the device object in a storage medium located in the management system;

receiving at an event generation engine an SNMP trap from the agent system;

converting the SNMP trap into an event with an SCOM event structure using the event generation engine, wherein the converting comprises:

receiving an agent system alert from the agent system at the event generation engine;

parsing the agent system alert by the event generation engine, wherein the parsing comprises identifying the agent system and a cause of the agent system alert; and populating the pre-determined data structure based, at least in part, on information parsed from the alert;

injecting the event into the device object using a InsertCustomMonitoringEvent command from an SCOM software development kit (SDK) over the separate communications channel;

creating, using the intermediate management module, a SCOM alert in response to the event in the device object, wherein at least one of the pre-defined condition triggers in the agent system corresponds to the SCOM alert; and transmitting the alert to the management system.

10. The method of claim 9, wherein the event generation engine include a cache which stores at least one previously generated event and the time at which the at least one previously generated event was generated.

* * * * *